United States Patent
Lenz

[15] 3,675,056
[45] July 4, 1972

[54] HERMETICALLY SEALED DYNAMOELECTRIC MACHINE

[72] Inventor: Henry George Lenz, Scotia, N.Y.
[73] Assignee: General Electric Company
[22] Filed: Jan. 4, 1971
[21] Appl. No.: 103,497

[52] U.S. Cl..............................................310/54, 310/59
[51] Int. Cl. .........................................................H02k 9/10
[58] Field of Search...........................................310/54–65

[56] References Cited

UNITED STATES PATENTS

| R26,776 | 1/1970 | Anderson et al.......................310/64 X |
| 1,448,700 | 3/1923 | Seidner................................310/64 X |
| 3,217,193 | 11/1965 | Rayner...................................310/54 |
| 3,241,331 | 3/1966 | Endress et al........................310/54 X |

FOREIGN PATENTS OR APPLICATIONS

| 1,090,750 | 10/1960 | Germany.................................310/64 |

Primary Examiner—D. F. Duggan
Attorney—John J. Kissane, James C. Davis, Jr., Frank L. Neuhauser, Oscar B. Waddell and Joseph B. Forman

[57] ABSTRACT

Effective spray cooling of the stator of a hermetically sealed motor is achieved without a reduction in stator flux carrying capacity by passing fluid refrigerant through triangularly shaped axial channels situated entirely within the stator teeth. Desirably, the edges of the channels are disposed parallel to the tapered faces of their associated teeth and the flux carrying area of each tooth is equal to the flux carrying area of the tooth face confronting the motor air gap. In one embodiment of the invention, entry of fluid refrigerant to the axial channels within the teeth is accomplished utilizing a diversely apertured annular manifold centrally positioned along the stator core and the refrigerant is withdrawn at both ends of the motor. Other refrigerant flow configurations, e.g., admitting the refrigerant at both ends of the motor and exhausting the refrigerant at the center or both ends of the motor, also are described.

9 Claims, 8 Drawing Figures

INVENTOR.
HENRY G. LENZ

HIS ATTORNEY

HERMETICALLY SEALED DYNAMOELECTRIC MACHINE

This invention relates to hermetically sealed dynamoelectric machines and in particular, to machines having triangularly shaped apertures disposed in a pre-determined position entirely within the stator teeth to optimize cooling of the machine without adversely affecting the flux carrying capacity of the stator.

The primary limitation restricting the generated output of hermetically sealed machines is heat generated by current flow in the stator windings and a number of techniques heretofore have been proposed to alleviate this problem. For example, insulating spacers have been inserted between stator windings to provide flow channels for axial passage of refrigerant in a liquid or gaseous state through the stator slots for removal of generated heat. Refrigerant flow channels within the slots, however, necessarily reduce the area available for the machine windings and the output of the machine therefore is limited.

Removal of heat generated by the stator windings also has been accomplished utilizing ducts extending longitudinally and/or radially through the stator laminations for refrigerant flow channels. Typically, these ducts have taken the configuration of circular apertures within the stator yoke, rectangular apertures within the stator teeth, radial ducts at intervals along the stator core and triangularly shaped apertures extending between the stator teeth and the yoke. When a portion of the yoke is removed to provide the refrigerant flow channels, however, the flux density increases adversely affecting the power factor and material utilization of the machine.

It is therefore a primary object of this invention to provide a dynamoelectric machine wherein optimum cooling of the stator is achieved without compromising the flux carrying capacity of the stator yoke.

Many of the fluid cooling systems of the prior art also characteristically admit the refrigerant directly into the end turn cavity of the motor so that the refrigerant impinges directly upon the stator end turns at high velocity. While impingement of the refrigerant directly upon the exposed end turns often is not undesirable, in some situations, e.g. where solid particles are contained within the refrigerant, the high velocity possessed by the refrigerant droplets can have a deleterious effect upon the end turn insulation.

It is therefore a secondary object of this invention to provide a dynamoelectric machine wherein spray cooling is achieved without impinging liquid refrigerant at high velocities upon the machine end turns.

It is also an object of this invention to provide a dynamoelectric machine characterized by a minimum temperature variation along the length of the machine.

These and other objects of the invention generally are achieved by the utilization of triangularly shaped apertures situated entirely within the stator teeth as axial flow channels for the fluid refrigerant. Thus, a dynamoelectric machine in accordance with this invention generally would include a cylindrical stator formed of a plurality of stacked magnetic laminations characterized by a homogeneous circular yoke and a plurality of selectively apertured teeth extending radially inwardly from the yoke. Each of the teeth sides are tapered at an angle to produce parallelly disposed slot walls for insertion of machine windings therein and a triangularly shaped aperture is located entirely within each stator tooth at an attitude producing constant flux carrying area over the length of the tooth, i.e. the total magnetic area of the tooth struts adjacent each triangularly shaped aperture is made substantially equal to the flux carrying area of the tooth face confronting the cylindrical rotor bore formed interiorly of the stator laminations. Means also are provided in the machine for passing a fluid refrigerant through the triangularly shaped apertures in an axial direction.

While the present invention is particularly defined in the appended claims, a more complete understanding of the basic principles of this invention can be achieved from the following detailed description of various specific embodiments taken in conjunction with the attached drawings wherein:

Figure 1:
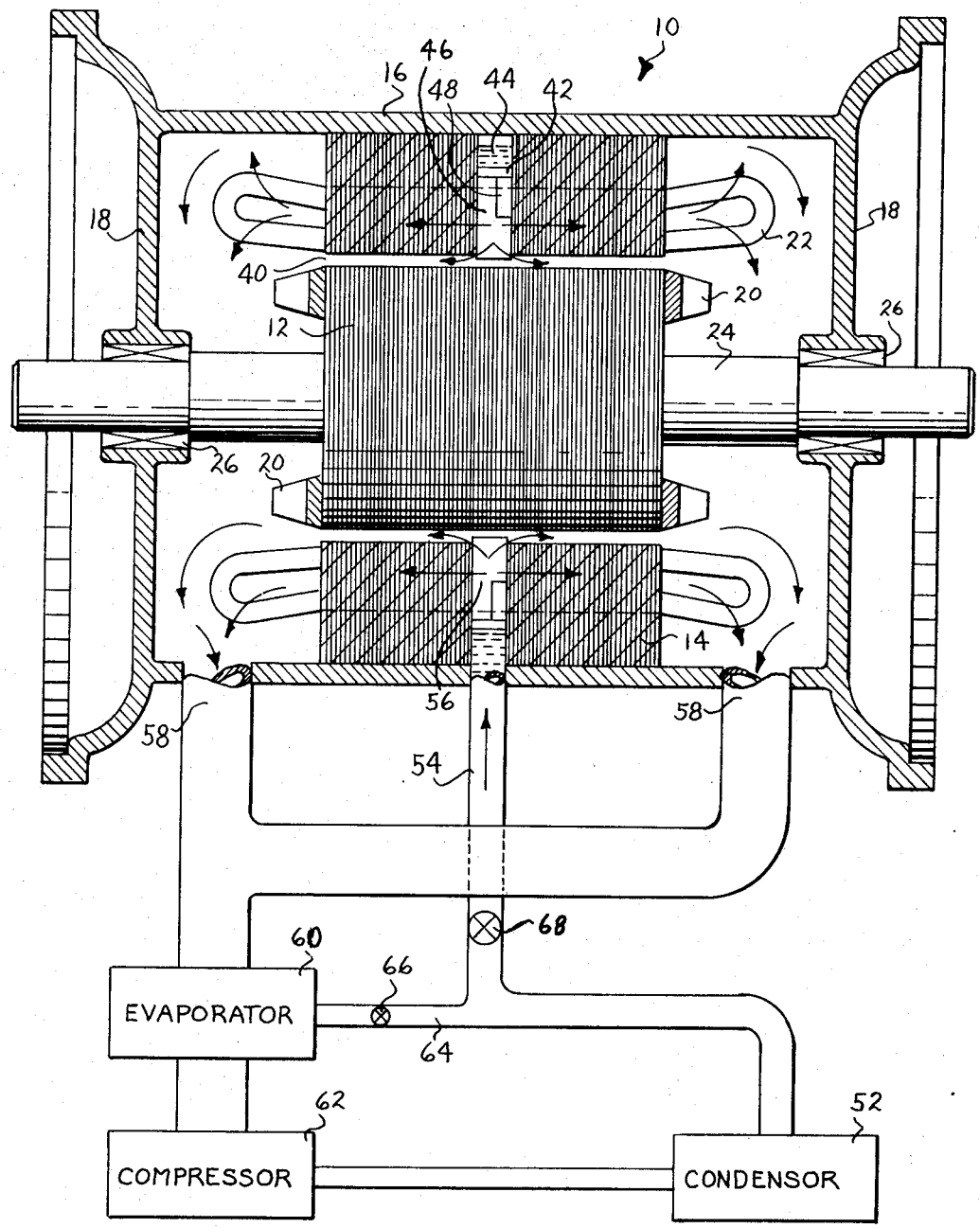
FIG. 1 is a sectional view illustrating a hermetically sealed, spray cooled motor in accordance with this invention.

A hermetically sealed induction motor 10 fabricated in accordance with this invention is illustrated in FIG. 1 and generally comprises a rotor 12, a stator 14 circumferentially disposed about the rotor for electromagnetic interaction therewith and a cylindrical housing 16 hermetically sealing the motor interior in association with end plates 18. Typically, rotor 12 can be of conventional squirrel cage design and desirably possesses a plurality of axially extending fan blades 20 situated at arcuately displaced locations along both ends of the rotor to distribute refrigerant uniformly throughout the end turn cavity. Suitably, the fan blades may be aluminum cast simultaneously with the casting of the rotor conductors (not shown) while the illustrated stator is fabricated of form wound coils 22 connected in conventional fashion for motor operation. Other refrigerant distribution techniques, e.g., nozzles disposed around the shaft, passages in the rotor end rings, etc., also could be used in place of the fan blades, if desired.

A shaft 24 passes axially through rotor 12 and has opposite ends supported by bearings 26 within end plates 18 to permit rotation of the rotor relative to the fixedly positioned stator. It will be appreciated that motor 10 also would include other conventional features such as, for example, bearing seals, which are not illustrated for purposes of clarity.

Figure 2:
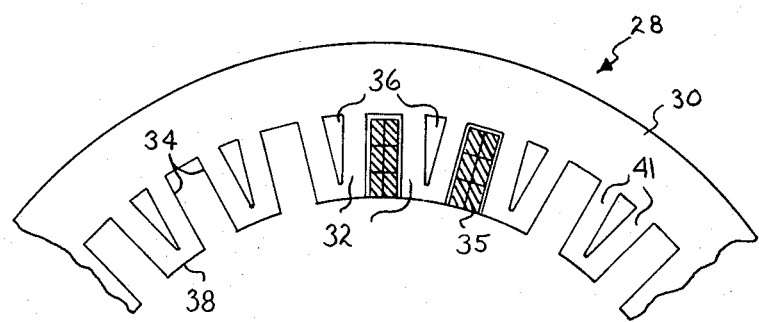
FIG. 2 is a partially broken away plan view of a stator lamination depicting the disposition of the refrigerant flow channels within the stator teeth.

Stator 14 is composed of a plurality of stacked magnetic laminations 28, illustrated in FIG. 2, having a homogeneous circular yoke 30 and a plurality of selectively apertured teeth 32 extending radially inwardly therefrom. Each of the teeth have linearly tapered sides 34 to provide parallel side walls for axially extending slots formed between the teeth of the stacked laminations to snugly accept rectangular form wound coil sides 35 therein. In accordance with this invention, each tooth is characterized by a triangularly shaped aperture 36 situated entirely within the tooth at an attitude to provide a flux carrying area along the tooth length equal to the flux carrying area of tooth face 38 confronting the rotor bore, i.e. the total area of the tooth struts 41 formed adjacent each aperture is equal at any radial location to the total area of tooth face 38. To achieve this result, the sides of each aperture are disposed parallel to the adjacent tapered side of the tooth at an attitude to converge at the center of tooth face 38. However, for tooling convenience and to increase the rigidity of the teeth, the internal angles of the stamped triangular apertures preferably are rounded (producing a slightly trapezoidal configuration in the stamped apertures) and apertures 36 of the preferred illustrated embodiment therefore do not extend entirely to the tooth face. In light of the foregoing, it will be appreciated tat the term "triangular apertures" as used in this specification, also includes geometric shapes differing slightly from a pure triangular configuration. For example, the term would include trapezoidal apertures wherein the non-parallel sides of the trapezoid are parallel to the adjacent sides of the teeth and the lengths of the parallel sides differ by a substantial amount, i.e., normally by at least a factor of four.

Notwithstanding the reduction of tooth rigidity produced by extension of the converging sides of apertures 36 to tooth face 38, such configuration can be desirable to provide fluid communication between the triangular apertures and the air gap 40 of the motor. In such event, a plurality of magnetic laminations (not shown) having teeth totally dissected by the triangular apertures preferably are secured, e.g. using epoxy resin adhesives, to laminations having triangular apertures with rounded edges (as illustrated in FIG. 2) to reduce the attendant loss of rigidity. When the stator subsequently is formed in conventional fashion, the stator will exhibit fluid refrigerant communication between the triangular apertures and the air gap through the totally dissected teeth while possessing mechanical rigidity imparted to the stator teeth by those laminations having rounded edges adjacent tooth face 38.

In accordance with this invention, triangular apertures 36 within each tooth are located entirely within the confines of the tooth, i.e. the triangular apertures do not extend into yoke 30, and the top of the triangular apertures preferably lie along the radial inner circumference of the yoke to provide maximum cooling surface for the stator. If desired, however, the apertures could terminate slightly interior of the tooth/yoke interface without significantly effecting the cooling characteristics of the stator. Because the most restricted section of the tooth, e.g. tooth face 38 confronting the air gap, is employed to determine the strut area to remain after aperturing of the stator teeth, the flux carrying capacity of each tooth is maintained at a maximum value along the entire length of the tooth. Moreover, because the yoke is not apertured, optimum utilization of the flux carrying capacity of the yoke is obtained and localized heating of the yoke is inhibited.

Figure 3:
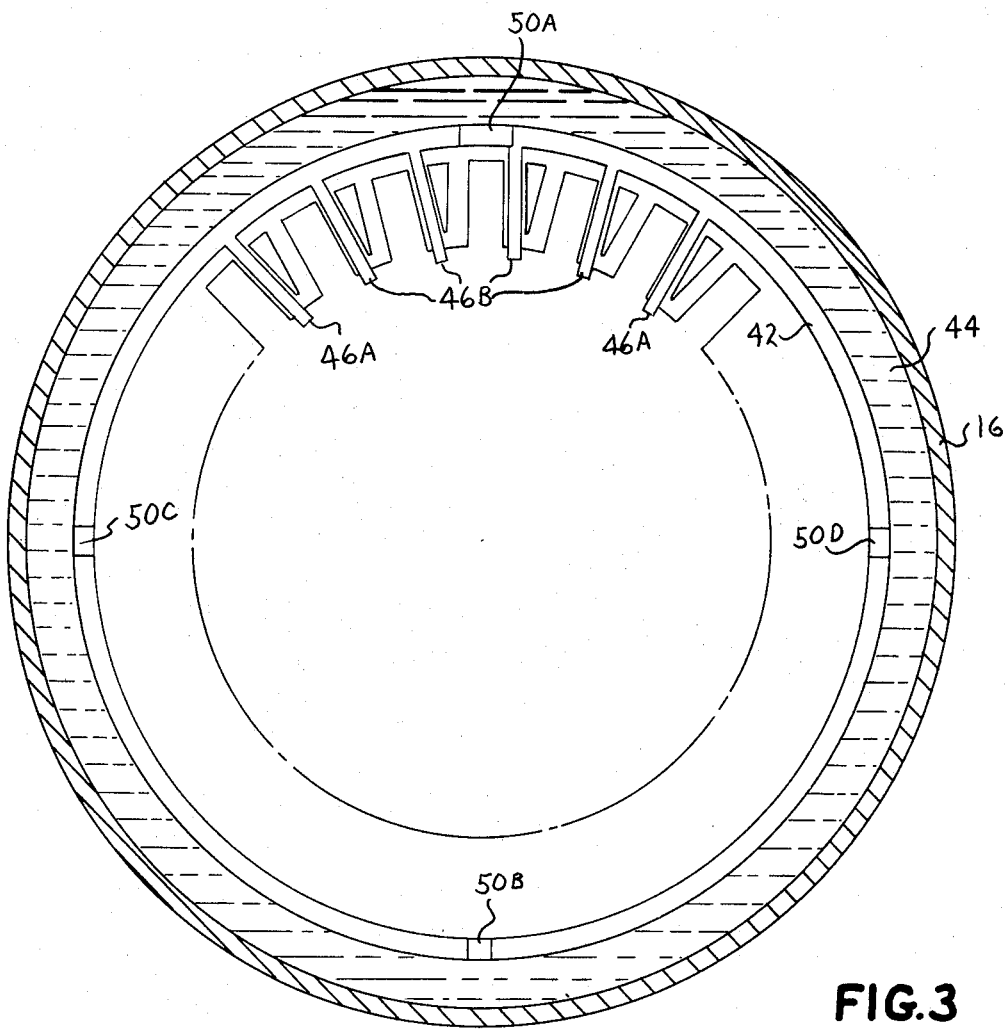
FIG. 3 is a partially broken-away -away plan view of the manifold employed to diffuse fluid refrigerant within the motor.

To communicate the liquid refrigerant with the triangularly shaped apertures within the stator teeth, an annular manifold 42, illustrated in FIG. 3, having a diameter preferably less than the diameter of magnetic laminations 28 is situated centrally along the stator core to form an annular liquid refrigerant reservoir 44 between the exterior surface of the manifold and radially removed motor housing 16. A plurality of rectangular plates 46 extend radially inwardly from the manifold to overlie one strut of each apertured tooth and the plates preferably are mechanically secured, e.g. by welding, to the adjacent magnetic lamination to fixedly position the manifold prior to stacking the laminations to form the stator. Four of the plates, i.e. plates 46A, situated at a 45° angle relative to the vertical and horizontal center lines of the stator are completely solid and serve to divide the manifold into four relatively isolated sections while the remaining plates forming the manifold, i.e. plates 46B, have rectangular apertures 48 (illustrated in FIG. 1) situated along the upper portion of the plates to permit fluid communication between areas located on opposite sides of the plates. Suitably the plates may be made of any mechanically strong material, for example, steel, and preferably should have a thickness slightly less than the width of a strut in the apertured teeth to inhibit blocking of the axial refrigerant passages formed through the aligned teeth.

Communication between reservoir 44 and the stator teeth is provided by four circular apertures 50 disposed at 90° intervals along the circumference of the annular manifold. To assure a substantially equal volume of fluid refrigerant passes through each aperture, the diameters of the apertures are dimensioned inversely proportional to the height of the liquid reservoir above the aperture. Thus, aperture 50A situated at the top of the manifold is substantially larger than aperture 50B situated at the bottom of the manifold while apertures 50C and 50D located at an intermediate refrigerant elevation have diameters approximately equal to the median between the diameters of apertures 50A and 50B.

In operation, a liquid refrigerant, for example, REFRIGERANT 11 is passed from condensor 52 and enters motor 10 through valved conduit 54 at a pressure to maintain annular reservoir 44 at a refrigerant elevation in excess of the elevation of topmost aperture 50A in manifold 42. The refrigerant then flows through the apertures within the manifold, as indicated by the flow arrows in FIG. 1, into radial zone 56 extending completely through the stator whereupon the refrigerant is diverted in axially opposite directions through both the aligned triangularly shaped apertures within the stator teeth and motor air gap 40 to be exhausted through orifices 58 situated at opposite ends of the motor. Within the motor, the refrigerant distributes itself according to the pressure differential and available area of the diverse axial flow channels (with approximately 80 percent of the refrigerant desirably passing through the stator teeth) and condenses as droplets optimumly covering the entire sidewalls of the flow channels with a liquid film. As the heat generated by the stator windings is absorbed by the liquid refrigerant, the refrigerant is converted to a gaseous state and replaced by a succeeding droplet of refrigerant. Because the refrigerant flows axially through each tooth of the stator, the refrigerant passes between each end turn of the stator assuring optimum cooling of the end turns. Additional cooling of the stator end turns also is effected by that portion of refrigerant passed through the air gap as the refrigerant flows downwardly across the end turns to be exhausted through orifices 58. Typically, the concentration of liquid within the refrigerant is substantially reduced, e.g. from an 80/20 liquid/gas weight ratio to an approximately 50/50 liquid/gas weight ratio, by thermal absorption both within the teeth and the air gap prior to arriving at the motor end turns. Moreover, because the centrally admitted refrigerant gently scrubs the end turns as the refrigerant passes therebetween (rather than being impelled thereon at a relatively increased velocity as occurs when the refrigerant is entered directly into the end turn cavity), the refrigerant has minimum adverse effect on the end turn insulation.

Figure 4:
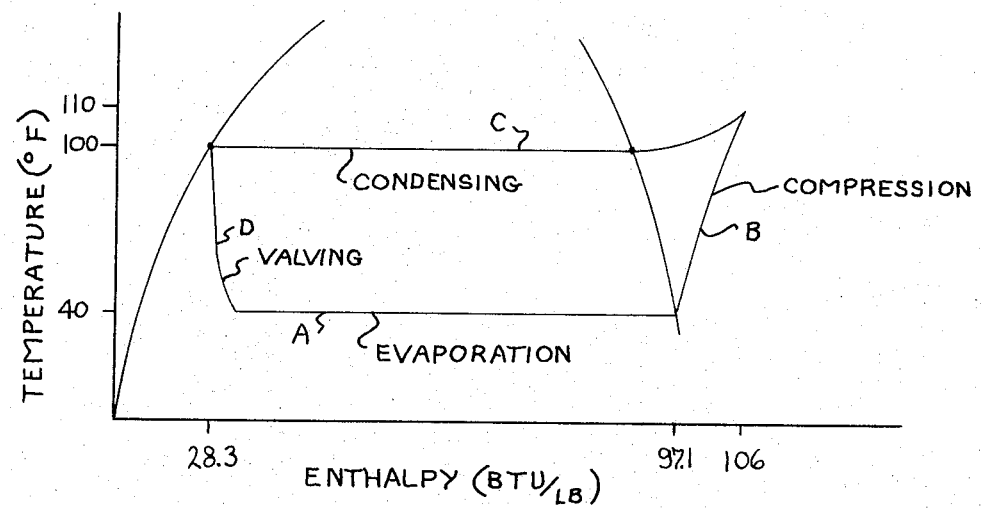
FIG. 4 is a graph portraying a typical temperature-enthalpy cycle of the refrigerant during motor operation, and, FIGS. 5–8 are sectional views illustrating alternate refrigerant flow paths employable with motors formed in accordance with this invention.

While the optimum refrigerant flow conditions will vary dependent upon such factors as the maximum permissible temperature rise within the motor and the axial length of the stator, a typical REFRIGERANT 11 compression cycle is illustrated by the temperature-enthalpy curve of FIG. 4. The refrigerant normally enters the motor cavity or housing containing approximately 80 percent liquid refrigerant and a portion of the refrigerant evaporates, i.e. along constant temperature line A of FIG. 4 before being exhausted through orifice 58 with a liquid to gas weight ratio in excess of one. The refrigerant then passes to evaporator 60 in a conventional manner, i.e. entering the evaporator below the liquid eliminator (not illustrated), and the remainder of the liquid refrigerant is converted to a gaseous state before being fed to compressor 62. In the illustrated case, the REFRIGERANT 11 typically is characterized by a pressure of 7.0 psia, a temperature of 40° F. and an enthalpy of 28.3 BTUs/lb. as the refrigerant enters the motor while refrigerant exhausted from the motor has an increased enthalpy and an unchanged temperature and pressure. After complete evaporation of the refrigerant in evaporator 60 to raise the enthalpy to approximately 97 BTUs/lb. the volume of refrigerant is reduced in compressor 62, i.e. along line B of FIG. 4 to raise the enthalpy of the REFRIGERANT 11 to 106 BTUs/lb. at a pressure of 23.6 psia and a temperature of 110° F. The refrigerant then passes to condensor 52 wherein the enthalpy is reduced, i.e. along line C to 28 BTUs/lb. at a pressure of 23 psia and a temperature of 100° F. whereupon the refrigerant is valved into motor 10. During the valving, the refrigerant is transformed along line D to a temperature of 40° F., a pressure of 7.0 psia and an enthalpy of 28.3 BTUs/lb. and the previously described thermal cycle is repeated. Because only a portion of the refrigerant normally need pass through the motor, a bypass line 64 is provided to permit continuous circulation of refrigerant not required to cool the motor with suitable valving, e.g., valves 66 and 68, permitting regulation of the quantity of refrigerant passing through the motor. Of course, regulation of the pressure differential across the motor also can be accomplished without valves by sizing tubing to and from the motor. In one specific operation, efficient cooling of a 720 horsepower motor has been obtained by passing REFRIGERANT 114 at 15° F. through the motor at a rate of 4.4 gals./min. utilizing the refrigerant flow technique illustrated in FIG. 1. The refrigerant temperature at the exhaust orifice measured approximately 17° F. and a maximum temperature of 81° C. was observed in the motor at the end turns.

When the refrigerant flow rate was increased to 5.2 gals./min. at an input temperature of 13° F., the friction and windage losses were observed to increase and the refrigerant exited the motor at a temperature substantially identical to the temperature of refrigerant entering the motor. The latter flow conditions produced a maximum temperature of 58° C. along the core of the motor.

Figure 5:
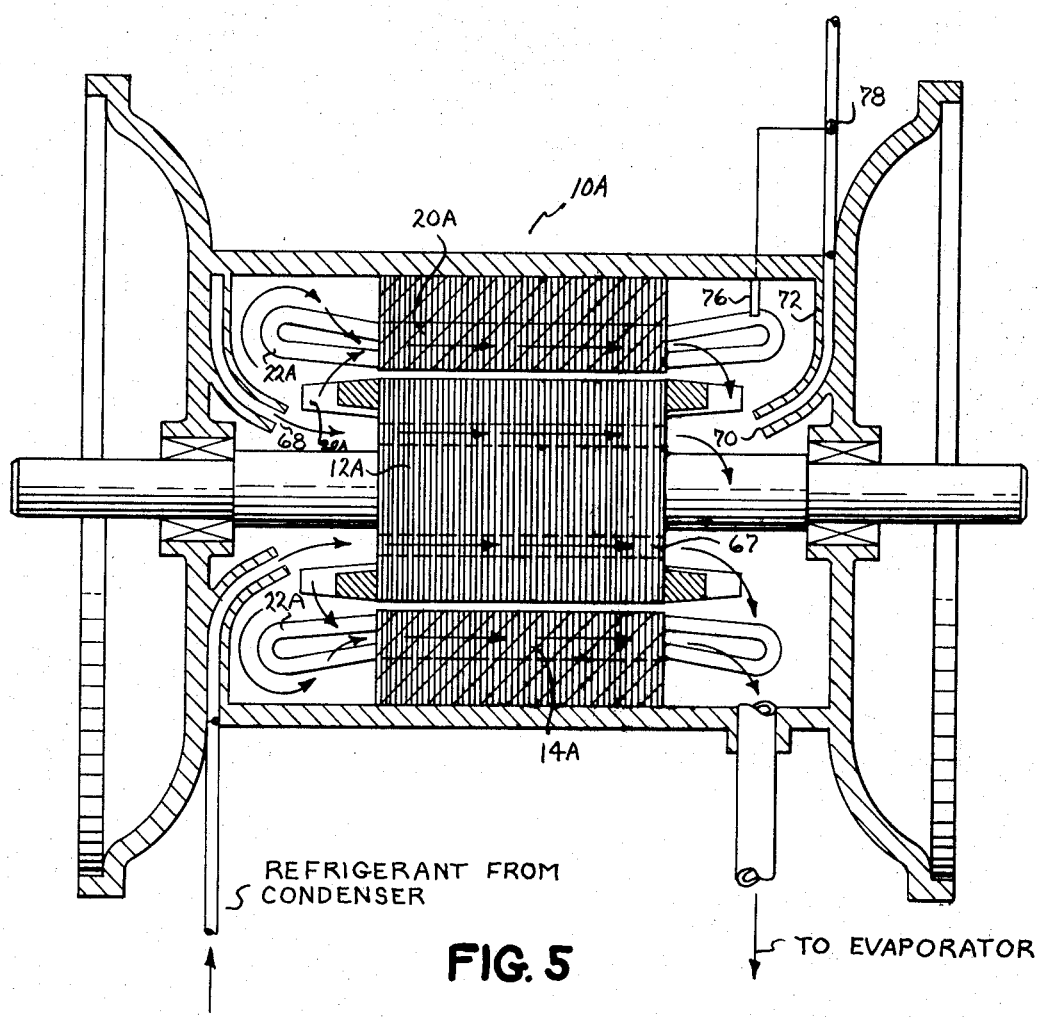

An alternate method of providing refrigerant flow through the motor is illustrated in FIG. 5 wherein the refrigerant is admitted at one end of motor 10A and exhausted through an aperture situated at the opposite end of the motor. Desirably, rotor 12A of the motor is provided with an axial passage 67 extending the length of the rotor and the refrigerant is admitted into the motor through dual orifices 68 disposed in a substantially confronting attitude with axial passages 67 to direct the refrigerant through the axial passages. A portion of the refrigerant admitted through orifices 68 also impinges fan blades 20A of the rotor to be thrown upon end turns 22A and passed axially along both the triangularly shaped apertures within the stator teeth and the motor air gap to cool stator 14A. If desired, an auxiliary refrigerant inlet 70 can be provided at the end of tubing 72 extending radially inward of the housing sidewall to permit addition of refrigerant to the motor interior upon a sensing of an excessive temperature increase by thermostat 76 situated within the motor end turns. When the end turn temperature exceeds the pre-determined limit of the thermostat, a signal is fed back to valve 78 to admit additional refrigerant to the motor end remote from the main refrigerant inlet orifices. Similarly, the flow of refrigerant into the motor can be continuously regulated by automatically controlling the operation of valve 68 of FIG. 1 in response to temperature variations along the length of the motor or the inlet and outlet pipes may be sized for the maximum operating conditions. Because the additional refrigerant enters motor 10A adjacent the rotor fan blades, rapid agitation and vaporization of the refrigerant is assured. Although a thermostat is illustrated in FIG. 5 for controlling the flow of auxiliary refrigerant to the motor, other conditions indicative of motor cooling, e.g. the refrigerant pressure at selected locations in the motor, also can be employed to control the operation of the valve 78.

Figure 6:
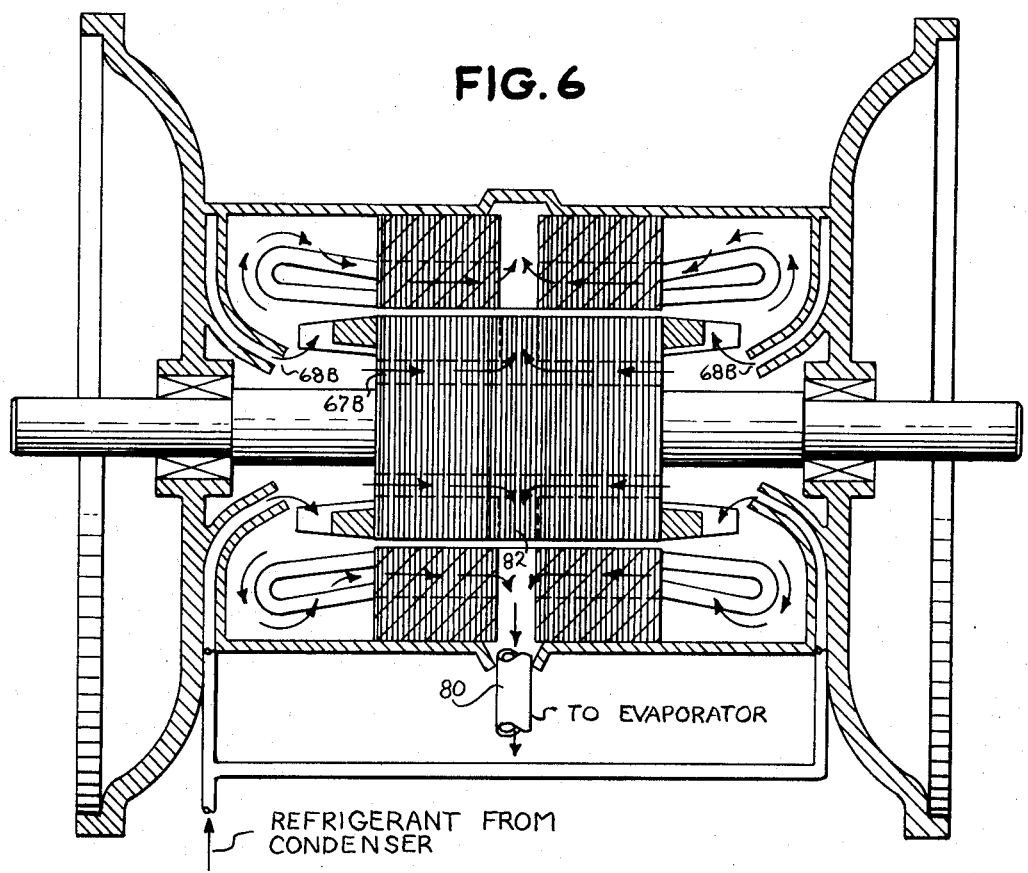

When the stator core is particularly elongated, a refrigerant flow, illustrated in FIG. 6, is utilized wherein the refrigerant enters the motor through orifices 68B situated at opposite ends of the motor in substantially confronting attitudes with axial passage 67B of rotor 12B and the refrigerant is exhausted through orifice 80 at the center of the motor. A portion of the refrigerant entering the motor through orifices 68B also is splashed over the stator end turns adjacent to each input orifice and passes axially through both the triangular apertures in the stator teeth and the motor air gap prior to exhaust by way of radial passageway 82 extending through both the stator and rotor. Suitably passageway 82 can be formed by any conventional method, e.g. positioning spacer blocks between laminations at the center of each structure or by drilling radial apertures through the rotor and stator, to permit communication in a radial direction from the axial passages within the motor to exhaust orifice 80.

Figure 7:
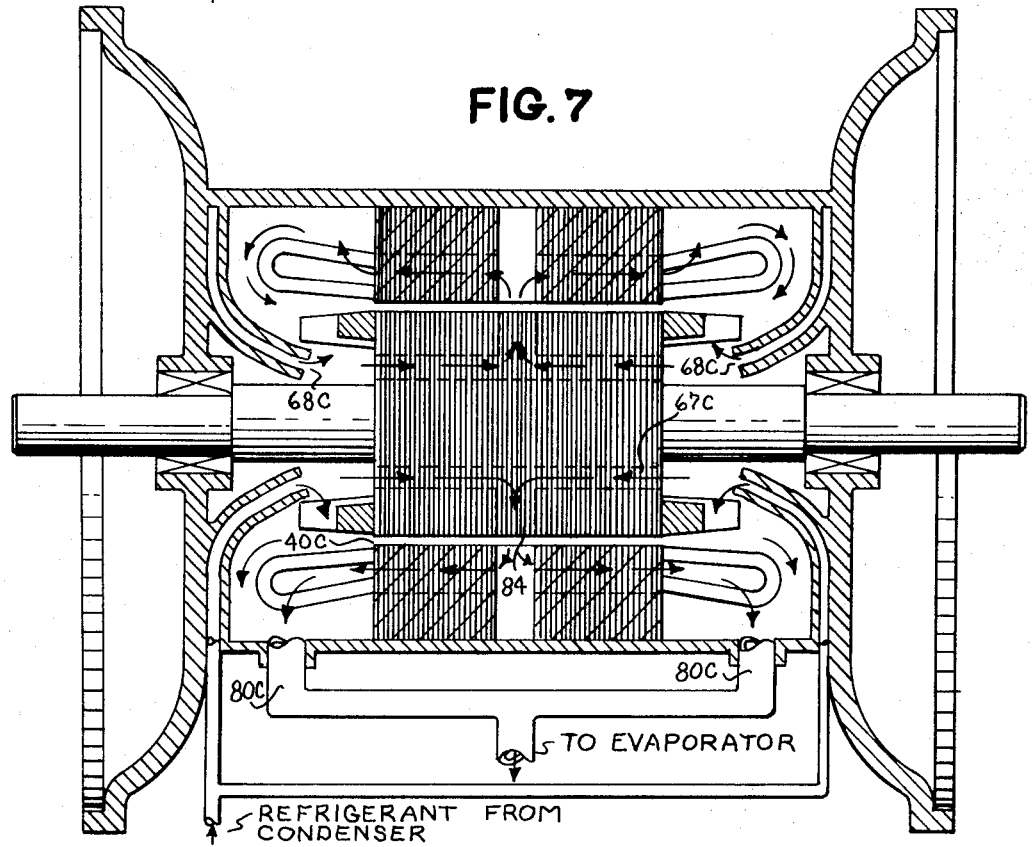

In motors having a short stack length and elongated end turns wherein enchanced cooling of the end turns is desired, the cooling system illustrated in FIG. 7 may be preferred. In this system, the refrigerant is admitted at both ends of the motor through orifices 68C disposed in a confronting attitude with axial passages 67C and a relatively large portion of the refrigerant is drawn radially outward over the end turns to be exhausted through orifices 80C situated below the end turns at both ends of the motor. A portion of the refrigerant also passes axially through rotor passage 67C to the center of the rotor whereat radial passageway 84 formed by suitable spacers between the rotor laminations communicates the refrigerant with rotor air gap 40C and triangularly shaped apertures within the stator teeth for passage through the motor in a direction axially opposite the refrigerant flow through rotor passage 67C. The refrigerant exiting through the stator teeth also augments the end turn cooling produced by the relatively enhanced flow of refrigerant directly across the motor end turns. Desirably, exhaust orifices 80C are situated axially outboard of input orifices 68C to increase the percentage of refrigerant passing axially through the motor. In general, a 720 hp motor receiving 3 gals./min. of REFRIGERANT 114 at 14° F. at each end of the motor along the flow path illustrated in FIG. 7 was found to exhibit a maximum temperature of only 45° C. along the length of the stator. By increasing the refrigerant input flow at each end of the motor to 5.3 gals./min. at a temperature of 17° F., the motor output could be raised to 900 hp with a maximum temperature of 72° C. along the stator.

Figure 8:
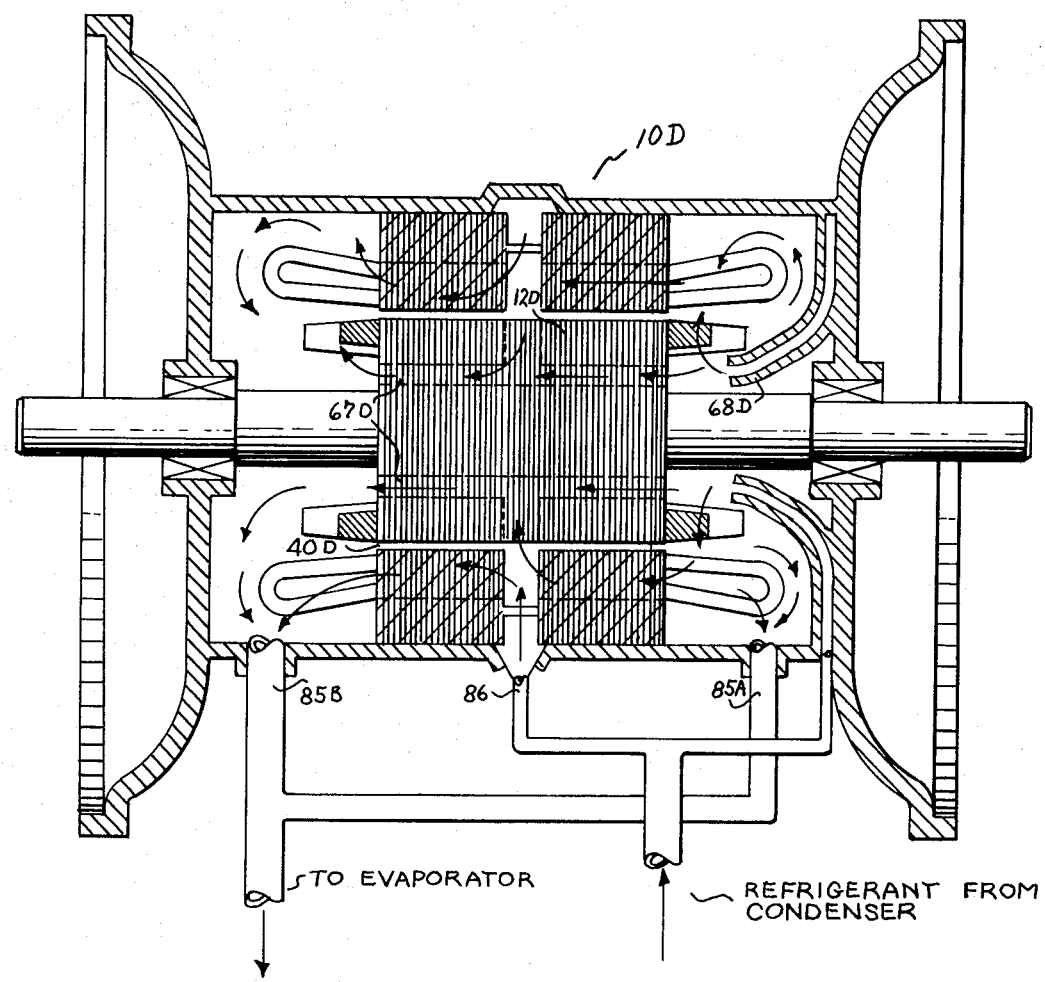

Because of the tendency for the refrigerant to become less effective as a heat sink with increased passage through the stator, generally overall superior motor cooling was obtained when the liquid refrigerant was introduced both at one end and the center of the motor and exhausted through orifices situated at both ends of the motor as illustrated in FIG. 8. Desirably, exhaust orifice 85A situated at the inlet end of the motor is smaller than exhaust orifice 85B at the opposite inlet end of the motor to produce a refrigerant flow direction toward the opposite inlet end (as illustrated by the arrows in FIG. 8). Thus, a portion of the refrigerant enters the motor through orifices 68D positioned in a confronting attitude with axial passage 67D through rotor 12D and the refrigerant distributes itself between air gap 40D and the axial flow channels in the stator teeth and the rotor with some refrigerant passing over the end turns to be exhausted through orifice 85A. As the portions of the refrigerant passing axially through motor 10D deposit as droplets upon the walls of both the stator and the rotor to be converted to a gaseous state, the quantity of liquid within the flowing refrigerant vapor is reduced tending to diminish the cooling capacity of the refrigerant. However, by the addition of refrigerant to the motor through centrally disposed orifice 86, augmented cooling of the motor is effected along the half of the stator situated remote from input orifices 68D. Because one refrigerant inlet, i.e. input orifices 68D, is situated directly adjacent to the end turn cavity while the second refrigerant inlet, i.e. orifice 86, is situated at the center of the motor remote from the end turns, uniform cooling of the motor is obtained. In one specific instance, a 720 hp motor having a refrigerant flow as illustrated in FIG. 8 and utilizing refrigerant 114 inputs of 3.5 gals./min. at 16° F. through central orifice 86 and 1.5 gals./min. at 16° F. through input orifices 68D was found to have a maximum temperature of 68° C. located in the stator end turns. When the flow rate was changed to 5.0 gals./min. at the input end of the motor and 3.0 gals./min. at the center of the motor, the motor was operated at an increased horsepower of 996 with a maximum temperature of 77° C. being produced in the stator end turns.

What I claim as new and desire to secure by Letters Patent of the United States is:

1. In a dynamoelectric machine, the combination comprising a stator formed of a plurality of axially aligned magnetic laminations stacked to form a cylindrical bore for reception of a rotor therein, said laminations having a circular yoke and a plurality of teeth extending radially inward from said yoke to provide slots along the length of said stator for insertion of machine windings therein, each of said teeth exhibiting a gradually decreasing width with increased span from the stator yoke, and a triangularly shaped aperture situated entirely within each of said teeth at an attitude to provide a constant flux carrying area over the length of each of said teeth, the sides of said triangularly shaped apertures adjacent said slots being disposed parallel to the adjacent tapered sides of said tooth at an attitude to converge at the tooth face confronting said bore to produce a total flux carrying area within said tooth at any radial location along the struts formed between the aperture and said slots substantially equal to the flux carrying area of the tooth face confronting said cylindrical bore, and means for passing a fluid refrigerant through the triangularly shaped apertures in an axial direction.

2. A dynamoelectric machine according to claim 1 wherein said means for passing fluid refrigerant through said triangularly shaped apertures comprises an annular manifold centrally disposed along the length of said stator and a plurality of orifices of diverse cross-sectional areas within said manifold to communicate said fluid refrigerant with the apertured stator teeth.

3. A dynamoelectric machine comprising a stator formed of a plurality of magnetic laminations stacked to form a cylindrical bore, each of said laminations having a completely homogeneous circular yoke and a plurality of teeth extending radially inward from said yoke to provide arcuately displaced slots extending the axial length of said stator, each of said teeth having tapered sides to produce parallel faces on adjacent teeth, machine windings disposed within said slots with the end turns of said windings protruding outwardly from the ends of the stacked laminations, an aperture situated entirely within each of said teeth, the sides of said aperture being parallel to the adjacent sides of said associated tooth at an attitude to converge at the center of the tooth face confronting said bore to provide a total flux carrying area at any radial location along the struts formed between said aperture and said slots substantially equal to the flux carrying area of the tooth face confronting said bore, means for passing a fluid refrigerant through said apertures in an axial direction, and a rotor disposed within said stator bore for electromagnetic interaction therewith.

4. A dynamoelectric machine according to claim 3 further including an axial channel within said rotor for the passage of fluid refrigerant therethrough, a first nozzle disposed in a substantially confronting attitude relative to said axial channel for propelling said fluid refrigerant toward said channel, a second nozzle situated at the end of said machine remote from said first nozzle, said second nozzle being disposed in a confronting attitude relative to said axial channel within said rotor and further including aligned radial passages extending through said stator and said rotor at the axial center of said machine for removal of fluid refrigerant from said machine.

5. A dynamoelectric machine according to claim 3 further including an axial channel within said rotor for the passage of fluid refrigerant therethrough, a first nozzle disposed in a substantially confronting attitude relative to said axial channel for propelling said fluid refrigerant toward said channel, a second fluid refrigerant inlet orifice situated along the length of said stator in communication with a radial zone extending through said stator laminations and a fluid refrigerant exhaust orifice situated at the end of said machine remote from said nozzle.

6. A dynamoelectric machine according to claim 5 wherein said radial zone extending through said stator laminations is in axial registration with a radial zone extending into said rotor and further including an axial passage extending the length of said stator.

7. In a dynamoelectric machine, the combination comprising a stator formed of a plurality of magnetic laminations stacked to form a cylindrical bore, said laminations having a circular yoke and a plurality of teeth extending radially inward from said yoke to provide axially extending slots along the length of said stator, a plurality of apertures situated within said magnetic laminations and extending at least partially within said teeth, a machine housing circumferentially enclosing said laminations, and an annular manifold disposed along the axial length of said stator to provide a liquid refrigerant reservoir between said manifold and housing extending to at least the center of said stator, said manifold having a plurality of orifices communicating said reservoir with said apertures in said stator teeth, the cross-sectional area of said orifices varying inversely with the height of said reservoir above each orifice.

8. A dynamoelectric machine according to claim 7 wherein said apertures within said teeth are triangularly shaped and said manifold is further characterized by a plurality of radially inwardly extending plates spaced at arcuately displaced locations along said manifold.

9. A dynamoelectric machine according to claim 8 wherein said manifold has a diameter less than the diameter of said magnetic laminations, said plates are equal in number and arcuate displacement to said stator teeth and further including means within said plates for communicating areas disposed on opposite sides of said plates.

* * * * *